Patented July 30, 1940

2,209,322

UNITED STATES PATENT OFFICE 2,209,322

RESIN RECOVERY

Frank W. Corkery, Crafton, Pa., assignor to Pennsylvania Industrial Chemical Corporation, a corporation of Pennsylvania No Drawing. Application December 31, 1937, Serial No. 182,804

6 Claims. (Cl. 260—81)

This invention relates to the recovery of coumarone-indene substances, of resinous sort, from a contaminated coal-derived still residue, and from contaminating compounds of such still residue; and to the purification of the still residue by removal of contaminating substances.

The still residue with which I am concerned is a substance residually produced in the fractionation and purification treatments of the light oil recovered in the by-product coking of coal. This light oil comes over in coal distillation. By far the greatest proportion of the light oil distills over before tar in by-product coking, and is recovered from the gases with which it comes over by being absorbed in a scrubbing oil, which scrubbing oil is usually a heavy cut of petroleum. This still residue contains polymers of resin-forming bodies in various stages of polymerization, some heavy monomers, traces of naphthalene, and various percentages of sulphates and sulphonates. It is a dark, viscous, oily substance deficient in drying qualities, and itself possessing but little utility in the arts. As it is commercially available, the still residue may be obtained from either of the following operations conducted upon the light oil.

Briefly to discuss this still residue, such still residue may be produced from the fractionation of light oil in initial, or "crude," stills; may be obtained as a residue of distillation after acid purification and neutralization of the light oil or light oil fractions; or may be obtained as bottoms in the stills by which a fractionation into No. 1 crude solvent naphtha (xylol) and No. 2 crude heavy solvent naphtha is effected. It is usually a mixture from all these sources, and is in degree contaminated by sulphates and sulphonates. The various still residues, because of the heat treatment, or acid purification treatment, or both of such treatments, to which the light oil is subjected, comprise a large percentage of polymers of the light oil unsaturates, such as coumarone and indene, in varying proportions. Usually the still residue is subjected in the by-product plant to a distillation for the removal of solvents and naphthalene. There is variation in the above-noted practice in different coking plants. Light oil is in some plants additionally recovered by distillation of the tar in which it is entrapped, not all of the light oil coming over during the initial distillation. This fraction of light oil recovered from the tar is contaminated with phenols, pyridine bases, and other typical tar ingredients, which however, are removed by a preliminary purification prior to the several typical fractionating and purifying treatments given above to which the light oil is subjected. The residues with which I deal may be considered, for all practical purposes, as free from tar ingredients, even though derived, or partially derived, by distillation from tar.

As still residue of this sort is commonly available commercially, it contains sulphonates from the acid purification and neutralization of the light oil, followed by the distillation in the "pure stills" which results in the production of a residue. These sulphonates are in the form of the alkaline and alkaline earth salts of sulphonates of light oil aromatics; and the alkaline and alkaline earth acid sulphonates of the light oil aromatics. Sulphate addition products are also present in the same mass of impurities. All are herein included in the general term "sulphonates."

Assuming that the starting material is a still residue containing sulphonates, a solid resinous material may be obtained from the still residue by distillation, which distillation may be either straight distillation, vacuum distillation, steam distillation, or a steam and vacuum distillation. In distilling the sulphonate contaminated still residue, I have carried the temperature of distillation to such point, and have continued distillation for such time that there is distilled off the coal tar solvent content of the still residue, and all other of the more volatile ingredients, thus leaving resin and sulphonates in intimately commingled condition. I have found a still temperature of 550° F., when distillation is conducted with steam and under vacuum of about 20 inches of mercury, adequate to obtain distillation to a point at which a residual sulphonate contaminated resin is obtained. At atmospheric pressure and without the use of steam I have found adequate for distillation a still temperature of 575° F., or slightly lower.

If such distillation be conducted upon a still residue of the sort above described, which is not subjected to initial purification, the resultant solid product, or sulphonate contaminated resin, is a dark brown to blackish material, which differs definitely in important characteristics from a coumarone type resin which does not contain sulphonates. It has an ability to resist flowing when raised to its softening temperature, possessing a high viscosity at such temperatures. When distillation is carried to a point at which substantially all the dimers of the light oil aromatics have been driven off, and the material recovered as solid resin, this solid resin usually has a melting-point approximately as high as 125° C. (ball and ring method). The color depth is about 17 or 18 on the coal tar resin color scale.

While usable for some purposes, this sulphonate contaminated resin obtained as the solid residuum from the distillation of unpurified still residue, has qualities which render it unsuitable for many purposes, amongst which is use as the resin content of a binder composition for mastic tile, linoleum, or the like. This is for the reason that its penetration at 115° F. (the standard upper temperature for determining penetration in mastic tile binder materials), is so high that it is difficult to combine with it in a tile binder sufficient plasticizer to give the binder composition adequate penetration at 77° F. without rendering its penetration at 115° F. too high. A tile made with resin from unpurified still residue also tends to water-spot.

Letters Patent of the United States No. 2,135,427, issued to me Nov. 1, 1938 and Letters Patent of the United States No. 2,180,728, issued to me Nov. 21, 1939, disclose purification of a still residue by removal of sulphonates therefrom, prior to the recovery of resin from the still residue, or other treatment conducted upon the still residue. I have further discovered that I may recover from the sulphonate content of the still residue a content of coumarone and indene in purified form. This may be done either by decomposition of the sulphonates in the still residue, accompanied by removal of the non-resinous products of decomposition, or may be done by decomposing the sulphonates after separation from the still residue in purifying the latter. In the first instance, which may be considered primarily a purification treatment, economy in procedure considered merely as such is attained, while additionally attaining economy because of the recovery of the desired resin-forming bodies from the contaminating sulphonates themselves.

Primarily I have discovered that I can decompose such sulphonates satisfactorily for my purpose by employing a mineral acid (desirably sulphuric acid) and an adequate temperature of treatment.

The following is an exemplary procedure, by which the sulphonate content of a sulphonate contaminated still residue may be decomposed, with recovery of coumarone-indene substances of the sulphonates, and purification of the still residue: 300 gallons of the sulphonate contaminated still residue were mixed with 200 gallons of water and with 25 gallons of 66° Bé. sulphuric acid, with agitation. Exothermic reaction took place, which substantially raised the temperature of the mixture. As, however, utilizing a moderate proportion of sulphuric acid, such as that given, decomposition of the sulphonates does not adequately proceed at temperatures created by the reaction itself, the mixture was heated by suitable means, such as live steam, to about 65° C. A white precipitate of calcium sulphate was formed rapidly. The precipitated calcium sulphate was then filtered.

In recovery, it is desirable to give the mixture at least one water washing, after the precipitate has been filtered out, and to neutralize with a very dilute alkaline wash. The water is then distilled off, and the still residue is distilled down to such point as may be desired. If the distillation be continued to a point at which solid resin is recovered, naphthalene, aromatic solvent, and dipolymer oil comprising the dimers of the resin-forming bodies are recoverable during the progress of distillation.

My preferred procedure has advantage over that above given, in that it avoids the necessity of filtering out precipitated calcium sulphate. An exemplary operation, in accordance with my preferred procedure may be given as follows: 900 gallons of still residue were diluted with 700 gallons of solvent for the still residue. This solvent may be either an aromatic solvent, such as solvent naphtha, or may be a low-boiling aliphatic solvent, such as petroleum naphtha. The still residue solution was agitated with 200 gallons of water, and steam was turned into the still residue solution to raise its temperature. When the temperature of the solution reached 50° C., 60 gallons of 66° Bé. sulphuric acid was added and agitation of the reaction mixture was continued. The exothermic nature of the reaction which followed raised the temperature of the reaction mixture to about 65° C., at which temperature the mixture remained, while being agitated for about twenty minutes. The mixture became noticeably thinner as a result of the reaction, and a dense white precipitation of calcium sulphate was formed throughout the mixture.

The reacted mixture was allowed to settle to the bottom of the vessel, and above this precipitate a water layer separated. This water layer contained about 400 gallons of water consisting of the 200 gallons initially added, and approximately 200 gallons of water condensed from the steam. The still residue solution was floated upon the water layer.

In recovery, the calcium sulphate and water are run off, leaving a still residue solution. This still residue solution is desirably given two water washings, followed by a very dilute alkaline wash. It may then be distilled for the recovery of solvent naphtha, increased by the solvent naphtha content of the still residue, and the remaining still residue content may be distilled to any desired point; usually to a point at which solid coumarone-indene resin is recovered.

The foregoing procedures, which may naturally be varied without departing from the spirit of this invention, involve both the purification of the still residue and the addition thereto of a hard resin content recovered from the sulphonates. It is possible to obtain the same result, albeit in less convenient manner, by first purifying the still residue with separation of the sulphonates therefrom, and as a second stage of the process decomposing the sludge to recover therefrom solid resin comparable to solid resin recoverable from the still residue purified.

The first stage of this process follows by preference the procedure disclosed in Letters Patent of the United States No. 2,180,728, issued to me Nov. 21, 1939, and is in accordance with such procedure as follows:

A low boiling aliphatic solvent, such as kerosene, v. m. p. naphtha, Stoddard solvent, ligroin, or gasoline, desirably a petroleum distillate of the gravity and boiling point known as "mineral spirits," is run into a treating tank and is agitated, as by means of a mechanical agitator. The still residue is then run into the tank, and is agitated with the petroleum distillate until a precipitate forms. Desirably, in this step the volume of petroleum distillate is approximately twice the volume of the still residue.

Before the precipitate has a chance to coagulate, water is run in, and is agitated with the body of liquid in the tank. This liquid itself contains in solution the aromatic hydrocarbon and resinous contents of the still residue, and the introduction of water by wetting the precipitate prevents its agglomeration. During this stage of the operation the mixture in the treating tank is at normal room temperature, at slightly elevated temperature, or at a temperature somewhat below normal room temperature.

Either in the initial treating tank, or more efficiently after running it into a plurality of settling tanks, the treatment of the mixture is continued. If the mixture is transferred to a plurality of settling tanks, desirably the transfer is made with the introduction of live steam into the mixture, and with agitation; and steaming and agitation may be continued for a short period of time to insure completion of the sludge precipitation, and to prepare the mixture for stratification on settling. The dispersion of live steam through the mixture is desirable for the reason that it speeds up the rate of settling. If more time be allowed, the use of steam may be omitted.

Upon being allowed to settle, stratification takes place in the mixture. The water content, which is the water initially added and that supplied by condensed steam if steam be used, floats the solution of still residue in petroleum distillate, to produce well defined stratification. In the water layer there is a settled mass of precipitate.

As the final stage of my preferred separation method, the petroleum distillate solution of still residue is decanted to leave water and sludge in the tank, or tanks. Any retained traces of solvent in the sludge are then steamed off, and the water is removed by blowing with warm air.

Resin recovery from the sulphonate sludge may be had by appropriate acid treatment, as in accordance with the following exemplary procedure: 1000 gallons of water insoluble sulphonate sludge was mixed with 700 gallons of 25% sulphuric acid; and while being agitated the mixture was brought to a temperature approximating 65° C. By reaction between the sulphonates and the sulphuric acid, calcium sulphate was formed, and to throw down a precipitate of the calcium sulphate 600 gallons of water was agitated with the reacted mixture. The soft resinous mass formed by reaction from the sulphonates was separated from the calcium sulphate by solution in an aromatic solvent, and filtration or settling.

Recovery of solid resin from solution in the solvent may be effected by distillation.

The solid resin recovered was a coumarone-indene resin of dark color, having a melting point (ball and ring method) of about 125° C. It amounted to approximately 50% the weight of the water-insoluble sulphonate sludge.

Considering the several exemplary procedures which have been given, and assuming that in the first two examples the final distillation was of an order resulting in the recovery of solid resin, the resin recovered had in each instance a color intensity of from about 10 to 12 on the coal tar resin color scale. In each instance there are several possible reactions between the sulphonates and the sulphuric acid, any one or more of which may be involved. These reactions may be given, as follows:

*Reaction No. 1—Acid sulphonate*

$$R\cdot(SO_2)_4\cdot(OH)_2Ca + H_2SO_4 + 3H_2O$$
$$\rightarrow R + CaSO_4 + 4H_2SO_3 + H_2O$$

*Reaction No. 2—Sulphonate*

$$R\cdot(SO_3)_2Ca + H_2SO_4 + H_2O$$
$$\rightarrow R + CaSO_4 + H_2SO_3 + H_2O$$

*Reaction No. 3—Sulphate additive*

$$R\cdot[Ca(SO_4)] + H_2SO_4 + H_2O \rightarrow$$
$$R + CaSO_4 + H_2SO_4 + H_2O$$

In these formulae "R" is a light oil aromatic, which may for all practical purposes be considered to be either coumarone, or indene, and which is the substance to be recovered. The calcium of the formulae may in the sulphonates be wholly or partially replaced by magnesium, sodium, or potassium. Lime is, however, the alkaline metal usually present preponderantly in sulphonates of still residues of this type. This is for the reason that lime is the alkaline material most commonly used in purification of the light oil from the by-product coking of coal.

While this reaction between the sulphonates and the sulphuric acid is exothermic, I have found that substantial decomposition in accordance with the given reactions does not effectively occur at temperatures below 50° C., and that it takes place rapidly as the temperature approaches 65° C. If the reaction temperature does not of itself attain 50° C., as may frequently occur in using dilute acid in the procedure in which sulphonates are decomposed after being separated from the remainder of the still residue, the provision of additional heat as by the described use of live steam is of importance.

The other mineral acids may be used to effect decomposition of the sulphonates without changing the form of the formulae given above. Thus hydrochloric acid may be used, with formation of calcium chloride; and nitric acid may be used, with formation of calcium nitrate. These acids are, from the viewpoint of cost and of convenience in use, less desirable reagents than sulphuric acid in my process of resin recovery.

As above indicated, the reactions illustrated by the given formulae are appropriate whether my method be conducted as a single stage purification and recovery process, or if it be conducted as a two stage purification and recovery process. Assuming that in the first instance, distillation is of an order resulting in the recovery of solid resin, the resin additionally recovered by decomposition of the sulphonates amounts to about 25% the total solid resin recovery from the still residue.

Fundamentally considered, the recovery is of coumarone and indene substances, separated by reaction from combination in the sulphonate content of the still residue. This is true whether the recovery of these bodies is in approximate entirety solid resin, as in a recovery stage conducted after purification of the still residue, or it is coumarone and indene in classified molecular condition as in the variants of my method in which distillation of purified still residue is conducted. As included in the sulphonates themselves, the coumarone-indene substances are almost entirely in the stage of the polymers of coumarone and indene higher than the dimers of those substances. In the remainder of the still residue they are present in various molecular stages, as monomers, dimers, and higher polymers. For this reason the order of distillation to which the still residue is subjected determines the melting point of the resinous residue in accordance with the proportion of dimers which are distilled off. The acid decomposition of the sulphonates does not produce polymerization as an incident, my instant process being definitely a recovery process, and not a polymerization process.

I claim as my invention:

1. The herein disclosed method of recovering coumarone and indene substances from metallic sulphonates of coumarone and indene which consists primarily in decomposing the sulphonates by reaction with sulphuric acid at a temperature at least as high as 50° C., and separating the coumarone and indene substances from sulphates formed by the reaction.

2. The herein disclosed method of recovering coumarone and indene substances from metallic sulphonates of coumarone and indene which consists primarily in decomposing the sulphonates by reaction with a mineral acid at a temperature at least as high as 50° C., and separating the coumarone and indene substances from inorganic salts formed by the reaction.

3. The herein disclosed method of recovering coumarone and indene substances in sulphonate-free condition and including a coumarone and indene content of metallic sulphonates of coumarone and indene in addition to the free coumarone and indene content in coal-derived still residue from the purification of light oil produced in by-product coking, which consists primarily in decomposing the sulphonates in the still residue by reaction with sulphuric acid at a temperature at least as high as 50° C. in the presence of water, separating the still residue thus purified and containing the coumarone and indene substances from the inorganic sulphate formed by the reaction, and by distillation recovering the coumarone and indene substances of the still residue.

4. The herein disclosed method of recovering coumarone and indene substances in sulphonate-free condition and including a coumarone and indene content of metallic sulphonates of coumarone and indene in addition to the free coumarone and indene content in coal-derived still residue from the purification of light oil produced in by-product coking, which consists primarily in decomposing the sulphonates in the still residue by reaction with a mineral acid at a temperature at least as high as 50° C. in the presence of water, separating the still residue thus purified and containing the coumarone and indene substances from the inorganic salts formed by the reaction, and by distillation recovering the coumarone and indene substances of the still residue.

5. The herein disclosed method of recovering coumarone and indene substances in sulphonate-free condition and including a coumarone and indene content of metallic sulphonates of coumarone and indene in addition to the free coumarone and indene content in coal-derived still residue from the purification of light oil produced in by-product coking, which consists in diluting the still residue with a solvent selected from the aromatic and the low-boiling aliphatic solvents, decomposing the sulphonates in the still residue by reaction with sulphuric acid at a temperature at least as high as 50° C. in the presence of water, separating the purified still residue containing the coumarone and indene substances from inorganic sulphate formed by the reaction by floating the still residue solution on the water, and by distillation recovering the coumarone and indene substances of the still residue.

6. The herein disclosed method of recovering coumarone and indene substances in sulphonate-free condition and including a coumarone and indene content of metallic sulphonates of coumarone and indene in addition to the free coumarone and indene content in coal-derived still residue from the purification of light oil produced in by-product coking, which consists in diluting the still residue with a solvent selected from the aromatic and the low-boiling aliphatic solvents, decomposing the sulphonates in the still residue by reaction with mineral acid at a temperature at least as high as 50° C. in the presence of water, separating the purified still residue containing the coumarone and indene substances from the inorganic salts formed by the reaction by floating the still residue solution on the water, and by distillation recovering the coumarone and indene substances of the still residue.

FRANK W. CORKERY.